(12) United States Patent
Noble et al.

(10) Patent No.: US 6,842,747 B2
(45) Date of Patent: Jan. 11, 2005

(54) METHOD AND APPARATUS FOR A DISC DRIVE INTERFACE

(75) Inventors: Gayle L. Noble, Boulder Creek, CA (US); Rick S. Shimizu, San Jose, CA (US); Jason P. Hanlon, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 383 days.

(21) Appl. No.: 09/892,290

(22) Filed: Jun. 26, 2001

(65) Prior Publication Data

US 2002/0048103 A1 Apr. 25, 2002

Related U.S. Application Data

(60) Provisional application No. 60/220,660, filed on Jul. 25, 2000.

(51) Int. Cl.[7] ............................................... G06F 17/00
(52) U.S. Cl. ..................... 707/1; 707/104.1; 707/101; 707/102; 707/200
(58) Field of Search ................ 707/1–10, 100–104.1, 707/200–206

(56) References Cited

U.S. PATENT DOCUMENTS

| | | | |
|---|---|---|---|
| 5,528,375 A | | 6/1996 | Wegeng et al. |
| 5,991,824 A | | 11/1999 | Strand et al. |
| 6,078,742 A | * | 6/2000 | Chow .......................... 710/113 |
| 6,081,407 A | * | 6/2000 | Khuu ......................... 360/99.06 |
| 6,088,202 A | * | 7/2000 | Kabasawa et al. ........... 360/245 |
| 6,088,743 A | * | 7/2000 | Takeda ......................... 710/52 |
| 6,094,707 A | | 7/2000 | Sokolov et al. |
| 6,128,717 A | | 10/2000 | Harrison et al. |
| 6,282,045 B1 | | 8/2001 | Glover |
| 6,349,351 B1 | | 2/2002 | Shimizu et al. |
| 6,622,151 B1 | | 9/2003 | Hamamoto et al. |

OTHER PUBLICATIONS

Goldman, www.cs.wustl.edu/~kjg/.cs102/Notes/StreamN-files, copyright 1999.*
Teener, IEEE 1394–1995 High Performance Serial. Bus, copyright 1999.*
Reiley et al., Micro Drive –a pluggable one–inch disk for portable devices, Nonvolatile Memory Technology Conference, 1998, 1998 Proceedings, Seventh Blennial IEEE, Jun. 22–24, 1998, pp. 51–54.*
Richkus et al., Virtual disk drive design game with links to math, physics and dissection activities, Frontiers in Education Conference, 1999, FIE '99, 29th Annual, vol. 2, pp. 12C3/18–12C3/22.*
Messner et al., A tutorial on controls for disk drives, American Control Conference 2001, Proceedings of the 2001, vol. 1, pp. 408–420.*

* cited by examiner

*Primary Examiner*—David Jung
(74) *Attorney, Agent, or Firm*—Raghunath S. Minisandram; Jesus Del Castillo

(57) ABSTRACT

Aspects of the invention include a method and apparatus to transfer data from a peripheral device directly to a disc drive storage system. In one aspect, the disc drive uses a transfer protocol that determines the types, sizes and data location structure for each file. In another aspect, the disc drive includes a file allocation table that stores the file location for the peripheral devices on the disc drive to increase the file transfer efficiency and speed.

20 Claims, 5 Drawing Sheets

METHOD AND APPARATUS FOR A DISC DRIVE INTERFACE

CROSS-REFERENCE TO A RELATED APPLICATION

This invention is based on U.S. Provisional Patent Application Ser. No. 60/220,660 filed Jul. 25, 2000 entitled "1394 Drive Interface Direct To Consumer Peripheral" filed in the name of Gayle L. Noble, Rick S. Shimizu, and Jason P. Hanlon. The priority of this provisional application is hereby claimed.

U.S. Patent application entitled "Method and Apparatus for a Disc Drive USB Client Interface", Ser. No. 09/892,317 filed on Jun. 26, 2001, filed in the name of Gayle L. Noble, Rick S. Shimizu, and Jason P. Hanlon is hereby incorporated herein by reference in its entirety.

BACKGROUND OF THE INVENTION

1. Field of the Invention

The invention generally relates to storing and retrieving data on a disc drive.

2. Background of the Related Art

Disc drives are capable of storing large amounts of digital data in a relatively small area. Disc drives store information on one or more recording media. The recording media conventionally takes the form of a circular storage disc, e.g., media, having a plurality of recording tracks. Conventional disc drives include one or more vertically aligned storage discs, each with at least one magnetic head for reading or writing information to the media. Typically, the magnetic head is attached to a positioner arm assembly that uses a motor to align the magnetic head above a selected track on the disc. The location of the magnetic head is typically determined by a disc controller that is given the position of a data area on the disc to read or write data. The precise location and movement of the head is typically accomplished by incorporating a closed-loop electro-mechanical servo system with a dedicated servo region, or regions, used to provide high speed or continuous feedback to the system to maintain accurate positioning of the data head.

Due to their large storage capacity relative to other forms of electronic digital data storage, disc drives are often used by electronic systems such as computers to permanently or semi-permanently store applications, e.g., software programs, data, etc. The amount of data stored on disc drives is a function of the media density, size, and number of medias used. The applications are generally stored as files that are then used by an end user, or users, to perform tasks such as word processing, calculations, and the like. To assist the applications in locating a file, conventional computer operating systems generally use a layered directory structure. The conventional layered directory structures usually have a main directory and then sub directories where the files are stored. For example, using the DOS operating system, a file named "xyz" may be given a logical location such as "c:/xyz" indicating that the file is located on the "c" drive at the root directory "/".

To allow an application to find and use files on the media, each file is given a different logical location on the media by the computer operating system. Operating systems communicate with the disc drive using logical block addresses (LBA). When an application makes a request for a file from the operating system, the operating system uses the file name to look up the location in terms of a starting LBA and the number of LBAs needed to read or write the file. The LBA is then translated by internal disc drive software to the actual physical location on the disc drive, i.e., the physical block address (PBA). The PBA includes a number of data sectors depending upon the location of the PBA on the media for storing data. The translation from LBA to PBA is necessary to allow the disc drive to implement a defect management scheme and to set aside reserved areas on the media for manufacturer specific data not generally accessible to the operating system such as disc drive operating firmware, etc.

Currently, devices having operating systems and drivers such as computers can generally interface directly with disc drives. Unfortunately, devices such as digital cameras and digital camcorders generally do not have operating systems that interface directly with disc drives. To transfer a file from a camera to a disc drive requires the user to use a computer having the proper device driver(s) to establish the interface and transfer the files. Unfortunately, to store the files between transfers the user must use temporary storage devices such as flash cards, memory sticks, tape, etc. increasing the cost of device ownership and slows the file transfer. While disc drives are capable of interfacing with peripheral devices that have the proper interface protocol such as IDE, 1394, etc. generally disc drives do not have the capability to interrogate the peripheral devices for the data structure of the file type and size to allow the disc drive to locate available media space and store the files.

Thus, what is needed is a method and apparatus that allows the disc drive to interface directly with peripheral devices and store data in an efficient and effective manner.

SUMMARY OF THE INVENTION

Aspects of the invention have particular advantages in electronic data storage systems. In one embodiment, the invention provides a method of transferring data from a peripheral device to a disc drive media includes providing data to be transferred to a disc drive, then determining the data structure of a peripheral device, determining from the data structure the location to store the data on the media, and then transferring the data.

In another embodiment, the invention provides a method of transferring data from a peripheral device to a disc drive, including connecting a peripheral device interface to a disc drive interface where if two or more peripheral devices are connected to a disc drive interface then aborting the transfer of data. Where if one peripheral device is coupled to a disc drive then requesting configuration data from the peripheral device, determining the file type and size from the configuration data, retrieving a disc drive data structure, determining the location on the disc drive to store the data, and transferring the data.

In another embodiment, the invention provides a disc drive system including a signal-bearing media means for storing data, a code memory means coupled to a read/write controller means for controlling the reading and writing of data to the signal-bearing media, a means for reading and writing the data to the signal-bearing media, a means for interfacing with a peripheral device, a processor means coupled to the code memory and the read/write controller including a program for transferring the data from a peripheral device to the signal-bearing media means.

BRIEF DESCRIPTION OF THE DRAWINGS

So that the manner in which the above recited features, advantages, objects, and aspects of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

DETAILED DESCRIPTION OF THE PREFERRED EMBODIMENT

Aspects of the invention have particular advantages in electronic data storage systems. One exemplary electronic data storage system commonly used in the computer industry, well suited for supporting the optimization method described herein, is known as a disc drive. As will be described below, aspects of the invention pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of aspects of the invention, represent alternative embodiments of the invention. It may also be noted that portions of the product program may be developed and implemented independently, but when combined together constitute embodiments of the invention.

Figure 1:
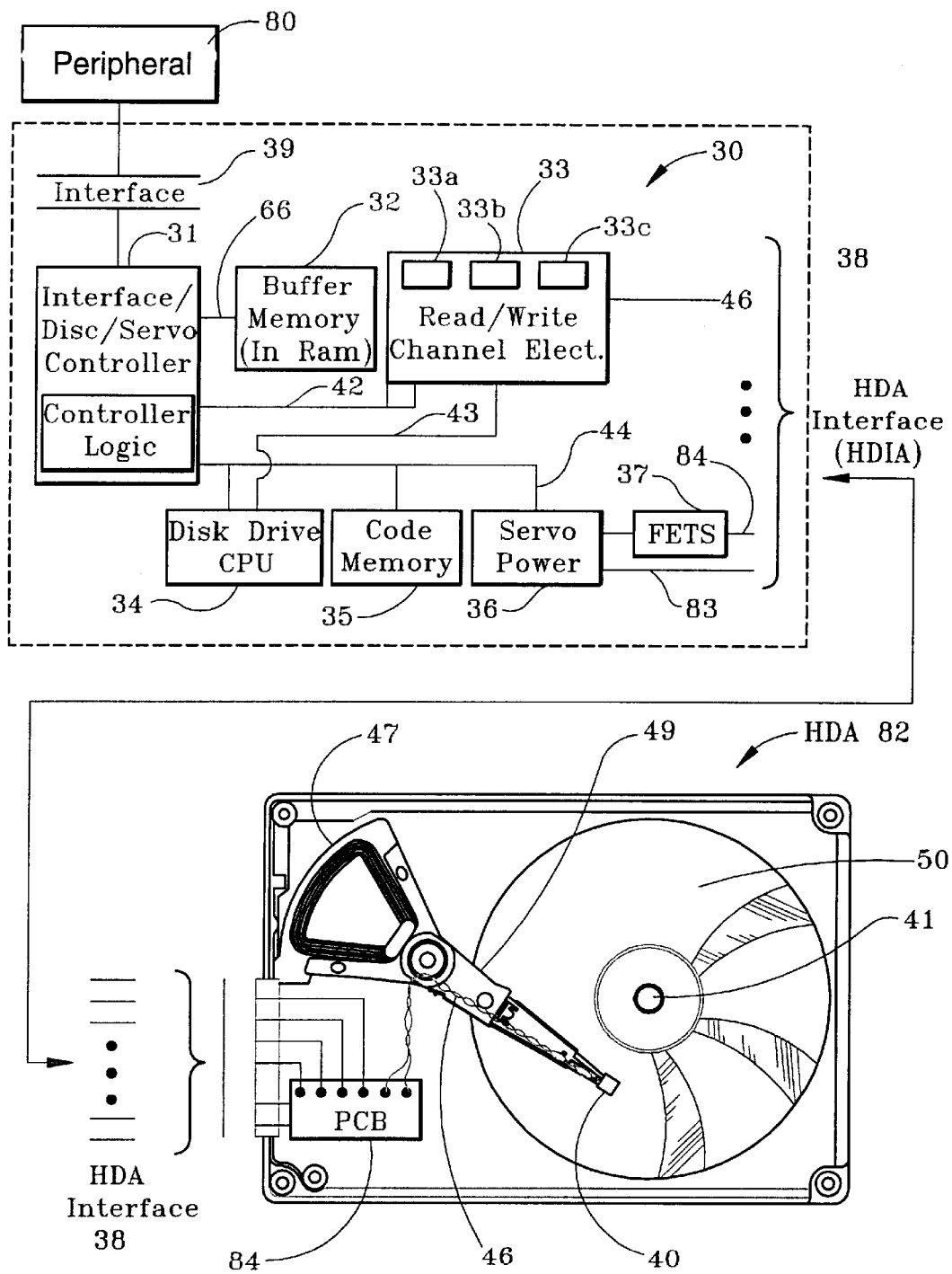
FIG. 1 is a plan view of a conventional disc-based apparatus for reading and writing data on a media wherein aspects of the invention may be used to advantage.

FIG. 1 is a plan view of a typical disc-based apparatus for reading and writing data on a media 50 wherein aspects of the invention may be used to advantage. FIG. 1 illustrates one embodiment of the invention including disc drive electronics 30 which in general includes an interface 39 such as a bus adapted to receive external signals and data, and a Head Disc Assembly Interface (HDAI) 38 for connecting the disc drive electronics 30 to the head disc assembly (HD) 82.

The HD 82 includes read/write transducer head(s) 40 coupled via wires 46 to the HDAI 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above the media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information.

A peripheral device 80 such as a digital camera, digital video camera, or scanner, and the like, of any conventional design includes a communication interface such as a 1394 communication interface, and the like, is coupled to the interface 39. The interface 39 is adapted to receive digital information from the peripheral device 80 and communicate with the disc drive electronics 30 to allow the flow of data to and from the disc drive to the peripheral device 80. The interface/disc/servo controller 31 provides a translation and command interface 39 such as a 1394 interface, IDE interface, and the like, between the peripheral device 80 and disc drive electronics 30 through the interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to a CPU 34 used for processing the disc drive commands, a code memory 35 adapted to store operational data and commands, and the servo power electronics 36, adapted to operate the servomotor 41 and actuator arm 49. Servo power electronics 36 are typically connected to the HD 82 via servo control connection PCBA 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 include read write logic 33a, write logic 33b, and servo logic 33c, and includes a connection to the interface/disc/servo controller 31 through the data bus 42 and a connection to the read/write head(s) 40 through read/write line 46. A serial bus 43 is used to send configuration commands from the CPU 34 to the read/write channel electronics 33.

FIG. 1 is merely one hardware configuration for a disc-drive data storage system. Aspects of the invention can apply to any comparable hardware configuration, regardless of whether the disc-drive data storage apparatus is a complicated, multi-media storage apparatus including a plurality of media types, or a single disc-drive data storage apparatus.

Figure 2:
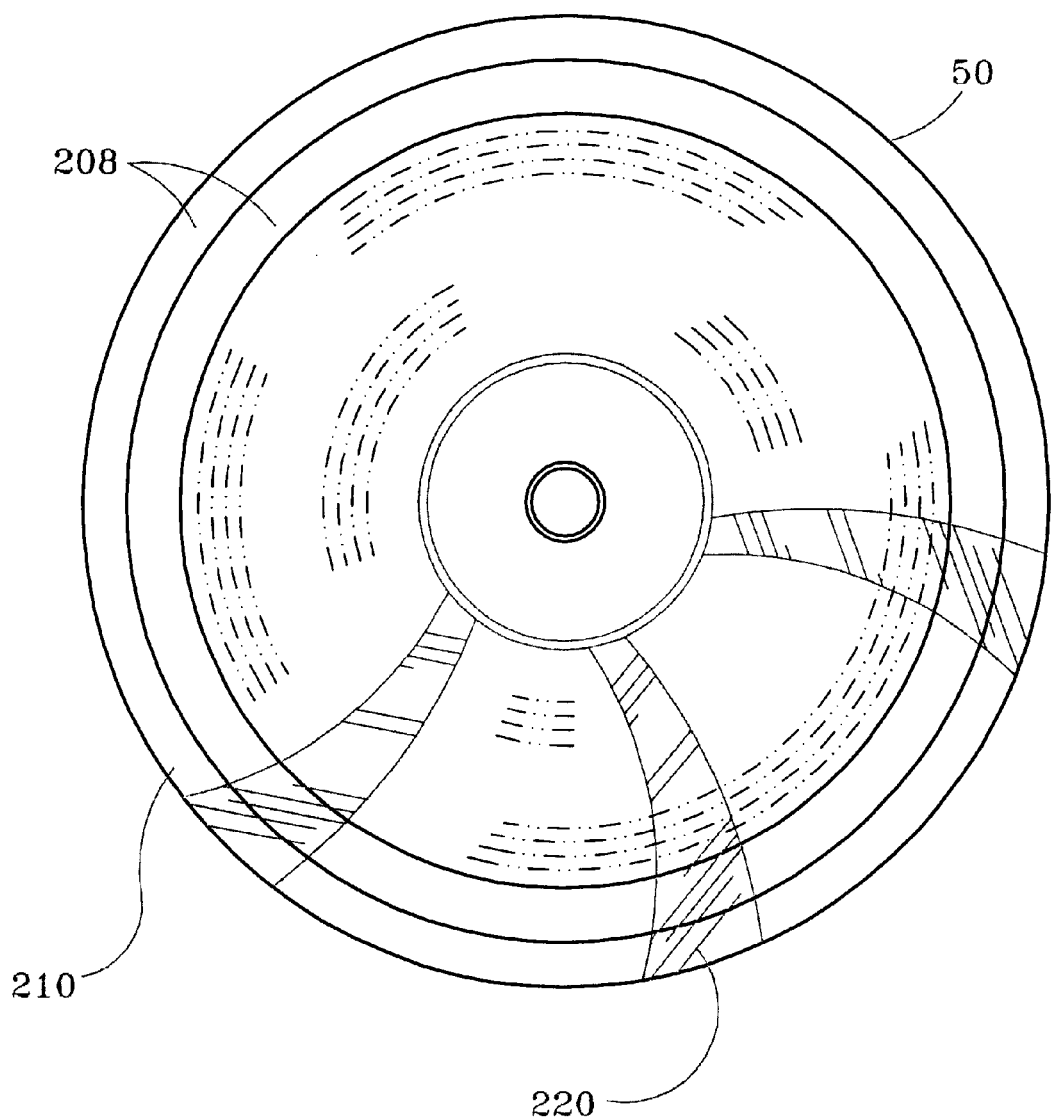
FIG. 2 is a plan view of conventional media for storing data wherein aspects of the invention may be used to advantage.

FIG. 2 is a plan view of the media 50 for storing data wherein aspects of the invention may be used to advantage. FIG. 2 illustrates data storage tracks 208 on the media 50 including data wedges 210 separated by a plurality of servo wedges 220 in accordance to the invention. As necessary, FIG. 1 is referenced in the following discussion of FIG. 2. For clarity, only portions of the tracks 208 are shown. Illustratively, a plurality of the tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 and read/write head(s) 40 to a particular track 208 on the media 50 in response from commands of the interface/disc/servo controller 31. The data wedges 210 are generally used for storing external data from an external user such as multimedia files and are generally accessible by the user through the interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is generally inaccessible to the outside user. The servo wedge 220 includes digital data that identifies the particular track (e.g., cylinder) and the sector. The servo wedge also includes area(s) of precisely placed magnetic bursts where the relative amplitude when read from the read/write head(s) 40, indicates the position of the head relative to the track center. Additional fields may be written into the servo wedge 220 as desired by the manufacturer. Data communicated to and from a data storage system is normally managed by the LBA rather than by the PBA. Data sectors are numbered blocks of data to be stored and retrieved. Data sectors are the fundamental units of data handled by the data storage system and are usually of fixed length, e.g., 512 bytes. In one aspect, one data sector equals the length of one data wedge 210. However, if the data wedges 210 are large, as is often the case with magnetic storage systems, several logical addressed data sectors may be stored in a single physical data wedge 210.

Figure 3:
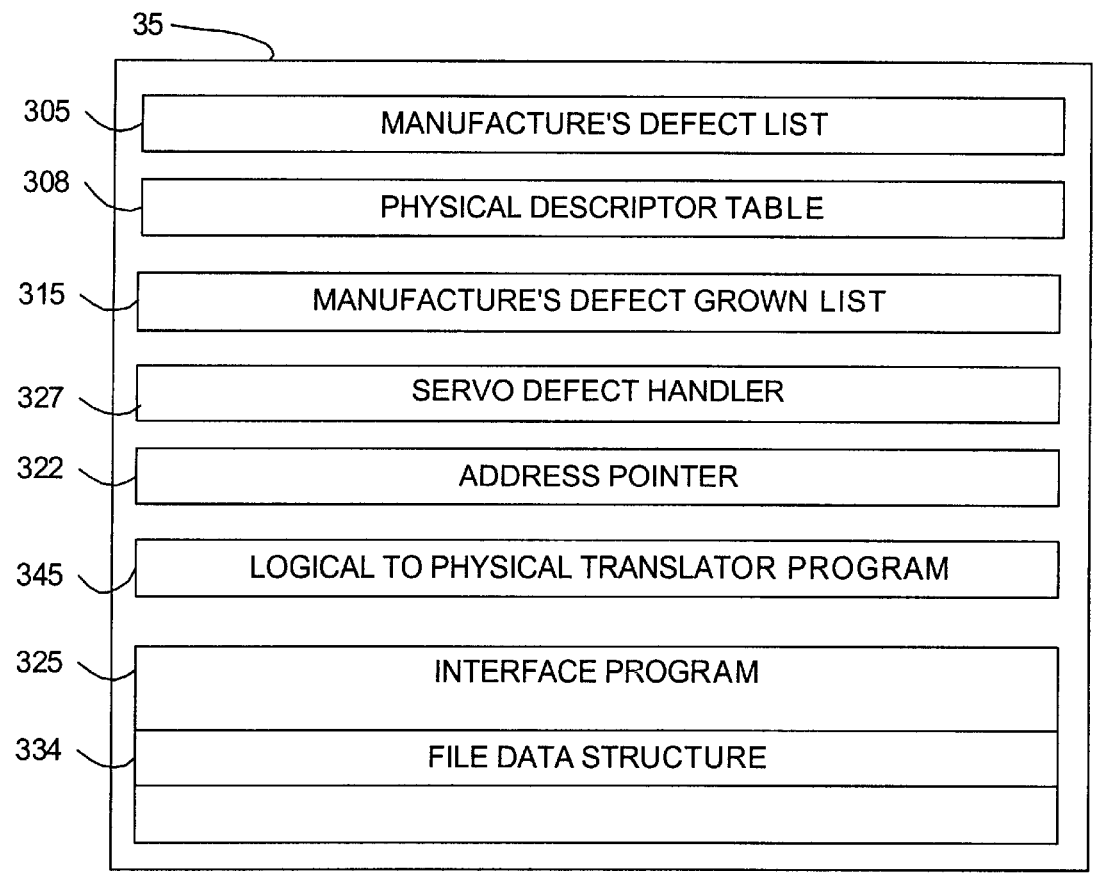
FIG. 3 illustrates a memory core for storing programming data in which aspects of the invention may be used to advantage.

FIG. 3 illustrates the code memory 35 for storing programming data in which embodiments of the invention may be used to advantage. The code memory 35 is preferably random access memory sufficiently large to hold the necessary programming and data structures of the invention. The code memory 35 may be used to store operating code, and other run-time code that enables the drive. For redundancy, the contents of the code memory 35 may also be stored to a plurality of reserved areas of the media 50 or into other areas of the drive electronics 30 such as buffer memory 32.

During manufacture, the recording media 50 is usually written to and then read back from to determine which PBAs are defective. As part of the process of converting a logical block address to a PBA on the media 50 two lists are stored in code memory 35, a manufacturer's defect list 305 and a physical descriptor table 308. The physical descriptor table 308 generally includes servo data that indicates how many bytes of data may be written between each servo wedge 220 and may indicate if the servo wedge 220 is to be skipped. Additionally, the physical descriptor tables 308 may indicate that a zone needs to be skipped, as there may be a very large defect in the media 50 covering more than one data wedge 210 within a zone. The manufacture's defect list 305, i.e., drive defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head(s) 40 inadvertently touching the surface of the media 50 during a read and/or write operation and physically damaging a data sector on the media 50. Media defects subsequent to the manufacturer's defect list 305 are placed in the manufacturer's defect grown list 315. Thus, the manufacturer's defect grown list 315 literally "grows" as the media 50 is used.

The code memory 35 further includes a logical to physical translation program 345 adapted to translate the LBA to the physical data location on the media 50 i.e., the PBA. The physical translation program 345 coordinates the translation of the logical address of a particular block of data to the physical address of the location at which the data is stored. The logical to physical translator program 345 uses the physical descriptor table 308, the manufacturer's defect list 305, and manufacturer's defect grown list 315 to determine if the requested sector(s) have moved due to defects during a read or write sequence. The code memory 35 also includes an address pointer 322 used to point the logical to physical translation program 345 to the physical descriptor table 308. The code memory 35 further includes a servo defect handler code 327 used to manage defective servo wedges 220. The data written after a defective servo wedge is generally unreliable. Therefore, the servo defect handler code 327 allows the disc drive to skip defective servo wedges 220 when needed.

In one aspect, the code memory 35 further includes a peripheral interface program 325. The peripheral interface program 325 is adapted to perform a communication process to find out the type of data, the size of the data, and the data structure being transferred from the peripheral device 80. In another aspect, the peripheral interface program 325 uses a file data structure 334 to establish the LBA locations of the files. The file locations are then converted to PBA by the logical to physical translator program 345. The LBA locations may be obtained from the operating system as a copy of the file allocation table, or from a drive-based file system. As files are transferred from the peripheral device 80, the file data structure 334 is updated as described below to reflect the new file locations and file access parameters such as the starting LBA and ending LBA locations.

Although code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 4:
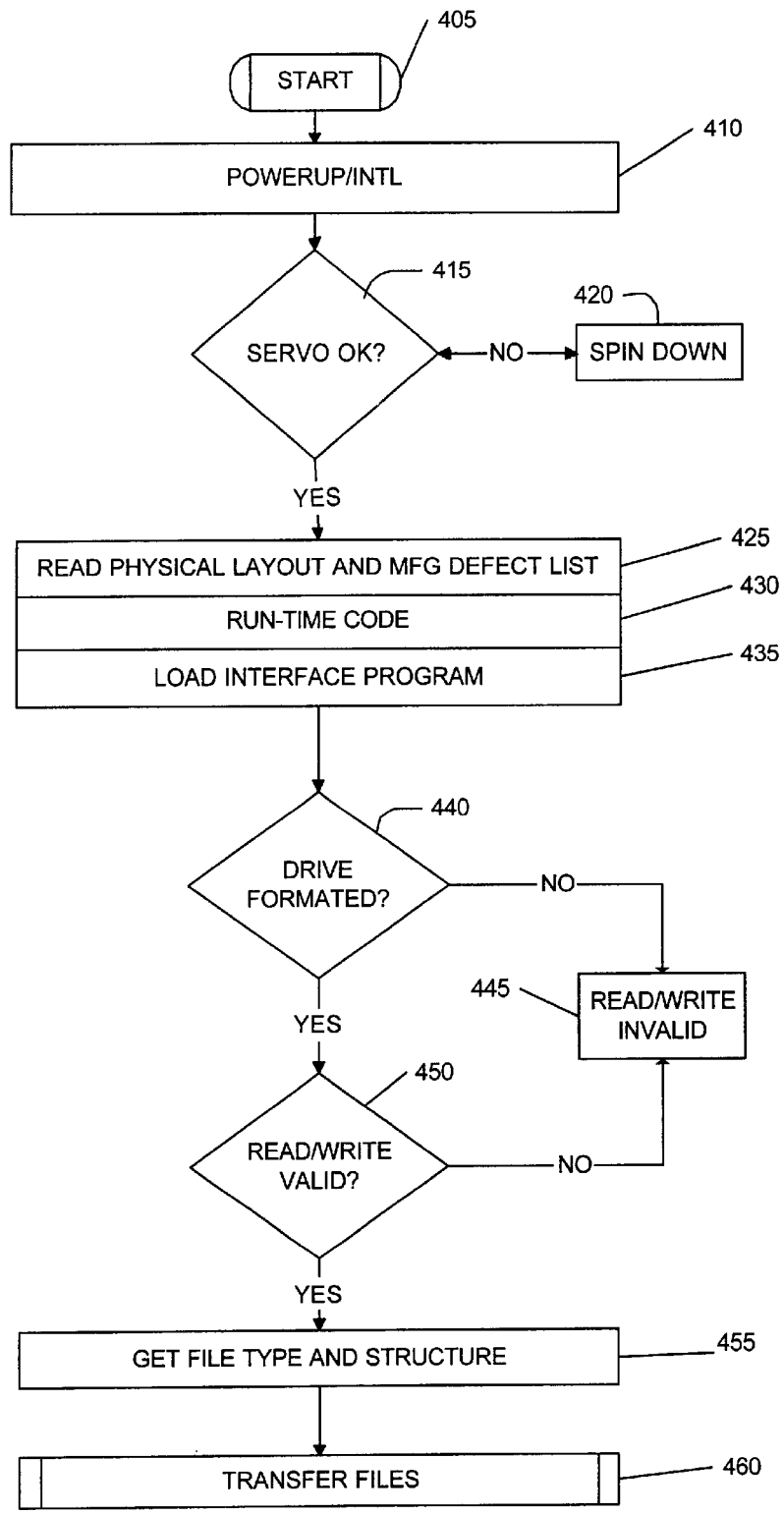
FIG. 4 is a flow diagram of a method for a start-up sequence for the disc-based apparatus of FIG. 1 in accordance with aspects of the invention.

FIG. 4 is a flow diagram of a method 400 for a start-up sequence for the disc-based apparatus of FIG. 1 in accordance with the invention. As necessary, FIGS. 1–4 are referenced in the following discussion of FIG. 5.

FIG. 4 is entered at step 405 when for example the peripheral device 80 instructs the disc drive electronics 30 to transfer data to the media 50. At step 410, the interface/disc/servo controller 31 initializes the disc drive electronics 30, CPU 34 the code memory 35, the servo power 36, FETs 37, the read/write channel electronics 33, and the buffer memory 32 and begins the process of "spinning", i.e., rotating, the media 50 up to prepare the media 50 for a read or write operation. At step 415, the method 400 determines whether the servomotor 41 is functioning properly. If the servomotor 41 is working improperly, the servomotor 41 spins down at step 420. If the servomotor 41 is functioning properly, at 425 the actuator arm 49 positions the read/write transducer head(s) 40 and reads the manufacturer's defect list 305 and physical descriptor table 308 stored within a reserved area within memory and/or on the media 50 such as a reserved area on a servo wedge 220. At step 430, run-time code such as the address pointer 322, the servo defect handler 327, logical to physical translator program 345, and the like, are loaded into the code memory 35 from the media 50 and/or memory into a separate data location to allow the normal operation of the drive. At step 335, the peripheral interface program 325 is loaded into code memory 35 from the media 50 and/or memory. At step 440, the media 50 is checked if it is properly formatted to receive data from the read/write transducer head(s) 40. If the media 50 is not properly formatted, then at 445, the read/write commands are set to invalid. If the read/write commands at step 450 where set to invalid from step 445, then the drive would be unable to be used for storing or retrieving data from the data wedges 210. If the media 50 is properly formatted, the method 400 proceeds to step 455 to get the file allocation table and file types from the peripheral device 80. Subsequently, method 500 then proceeds to step 460 to transfer the files from the peripheral device 80 as described below.

Figure 5:
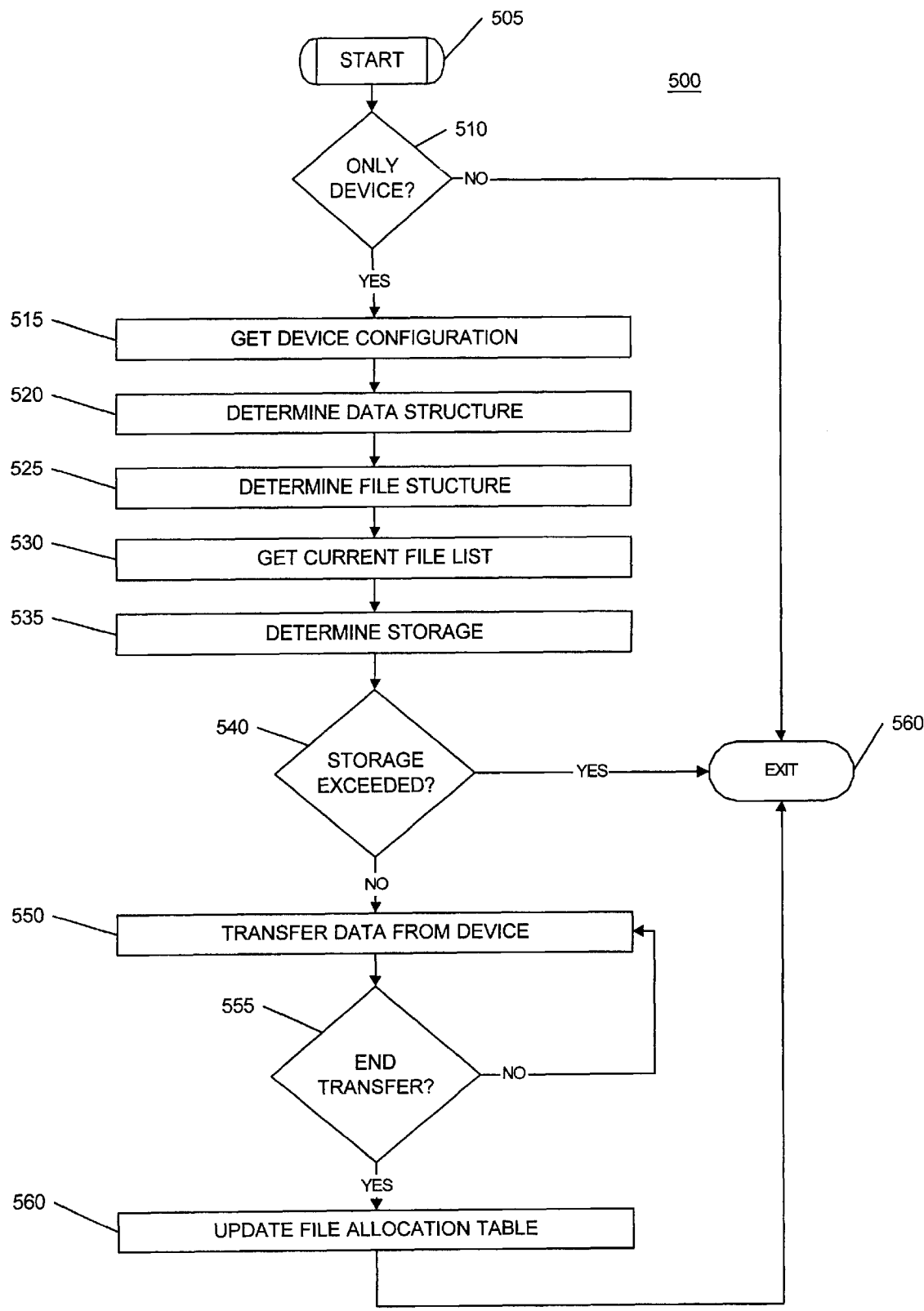
FIG. 5 is a flow diagram of a method for a peripheral interface on a disc-based apparatus of FIG. 1 in accordance with aspects of the invention.

FIG. 5 is a flow diagram of a method 500 for a method of transferring data from a peripheral device 80 to the media 50 of FIGS. 1 and 2 in accordance with the invention. As necessary, FIGS. 1–4 are referenced in the following discussion of FIG. 5.

FIG. 5 is entered at step 505 when a file transfer is initiated from step 460. At step 510, the method 500 determines if the interface 39 is connected to more than one peripheral device 80. In one aspect, if there is more than one peripheral device 80, then the transfer is aborted and the method 500 exits at step 560. However, if there is only one peripheral device 80 coupled to the interface 39, then the method 500 proceeds to step 515 to retrieve the configuration of the peripheral device 80. Using the configuration data, the size, type, and structure of the data within the peripheral device 80 are determined at step 520. The data structure 334 of the disc drive is examined at step 525 to determine the disc drives file allocation. At step 530, the current file list is derived from the data structure 334 and then compared at step 540 to the data structure of the peripheral device 80 to determine where the data may be stored. At step 540, if it is determined that there is insufficient room to store the data, the method 500 exits at step 560. If at step 540, the method 500 determines if there is adequate storage on the disc drive then method 500 proceeds to step 550 to transfer the data. In one aspect, only the difference between the data structure 334 (i.e., file allocation table) and the data structure from the peripheral device 80 is used to determine the files to transfer. For example, consider the case where ten file names are stored in the data structure of the peripheral device 80, and five of the ten file names are already located on the disc drive data structure 334 (i.e., file allocation table), given adequate space on the disc drive media 50, the method 500 would only transfer the five files that are not currently on the media 50. Obviously, any portion of the files can be transferred, simply writing over the current files on the disc drive. However, writing only the new files allows the transfer to generally be more efficient. In another aspect, at step 535, the data structure 434 of the media 50 and file configuration of the peripheral device 80 are compared and the user is given the choice to overwrite any existing files on the media 50. At step 550, the method 500 determines if the transfer has ended. If the transfer has ended, then the method 500 proceeds to step 560 to update the file allocation table to the data structure 334. Subsequently, the method 500 exits at step 560.

Although various embodiments which incorporate the teachings of the invention have been shown and described in detail herein, those skilled in the art can readily devise many other varied embodiments within the scope of the invention. For example, the memory may include combinations of the buffer memory 32, the media 50, or an external read ahead memory. In another aspect, the interface 39 may be internal or external to the disc drive. For example, the method 500 may be part of a device that includes a 1394 interface and is adapted to communicate with the disc drive 1394 interface and the peripheral device 80. In another aspect, the method 500 is adapted to communicate with more than one peripheral device 80 coupled to the disc drive interface 39 by incorporating switches and/or different device bus addresses.

In summary, aspects of the invention have particular advantages in electronic data storage systems. In one embodiment, the invention provides a method 500 of transferring data from a peripheral device 80 to a disc drive media 50 where the method 500 includes the steps of providing data to be transferred to a disc drive media 50, then determining 515 the data structure of a peripheral device 80, determining 530 from the data structure the location to store the data on the media 50, and then transferring 550 the data. In one aspect, the data structure includes a file type and file size. In another aspect, transferring 550 the data includes transferring the data using a 1394 interface, where the peripheral device 80 includes a camera, video camera, or scanner. In another aspect, determining 535 the location to store the data on the disc drive media includes comparing 535 a peripheral device data structure to the disc drive data structure 434, where, in one aspect, the disc drive data structure is a file allocation table. In addition, the method 500 includes determining 530 the location of the available data locations on the media 50, then upon data transfer, updates the disc drive data structure 434 and the peripheral device data structure with the new data locations.

In another embodiment, the invention provides a method 500 of transferring data from a peripheral device 80 to a disc drive media 50, including connecting a peripheral device interface to a disc drive interface 39 where if 510 two or more peripheral devices are connected to a disc drive interface then aborting 560 the transfer 550 of data. Where if one peripheral device 80 is coupled to the disc drive interface then requesting 515 configuration data from the peripheral device 80, determining 520 the file type and size from the configuration data, retrieving 525 a disc drive data structure 434, determining 535 the location on the disc drive to store the data, and transferring 550 the data. In one aspect, the connection interface 39 includes a 1394 interface. In another aspect, the peripheral device 80 includes a 1394 interface. In still another aspect, the peripheral device 80 includes a camera, video camera, or scanner, and where the disc drive data structure 434 is a file allocation table. Further, the method 500 of determining the location to store the data on the disc drive media 50 includes comparing 535 a peripheral device data structure to the disc drive data structure 434.

In another embodiment, the invention provides a disc drive system including a signal-bearing media means 50 for storing data, a code memory means 35 coupled to a read/write controller means 33 for controlling the reading and writing of data to the signal-bearing media 50, a means 40 for reading and writing the data to the signal-bearing media 50, a means for interfacing 39 with a peripheral device 80, a processor means 34 coupled to the code memory 35 and the read/write controller 33 including a program 325 for transferring 550 the data from a peripheral device 80 to the signal-bearing media means 50. In one aspect, the program 325 when executed by the processor means 34 performs the steps of connecting a peripheral device interface to the disc drive interface means 39 where if two or more peripheral devices 80 are connected to a disc drive interface means 39 then aborting 560 the transfer 550 of data. In another aspect, if one peripheral device 80 is connected to the disc drive interface means 39 then requesting 515 configuration data from the peripheral device 80, determining 520 the file type and size from the configuration data, retrieving 530 a disc drive data location structure, then determining 535 the location on the disc drive media 50 to store the data, and transferring 550 the data. In another aspect, the connection interface means 39 includes a 1394 interface. In still another aspect, the peripheral device 80 includes a 1394 interface and where the peripheral device 80 includes a camera, video camera, or scanner. In another aspect, the disc drive data structure 434 is a file allocation table and where determining 535 the location to store the data on the media 50 includes comparing a peripheral device data structure to the disc drive data structure 434.

While foregoing is directed to the various embodiments of the invention, other and further embodiments of the invention may be devised without departing from the basic scope thereof, and the scope thereof is determined by the claims that follow.

What is claimed is:

1. A method of transferring data from a peripheral device to a electronic data storage device, comprising:
    providing data to be transferred to a storage device;
    determining the data structure of the peripheral device;
    determining from the data structure a location to store the data on the storage device; and
    transferring the data,
    wherein determining the location to store the data on the storage device comprises comparing the peripheral device data structure to the storage device data structure.

2. The method of claim 1, wherein the peripheral device comprises a camera, video camera, or scanner.

3. The method of claim 1, wherein transferring the data comprises transferring the data using a 1394 interface.

4. The method of claim 1 wherein the data structure comprises a file type and file size.

5. The method of claim 1, wherein the storage device data structure is a file allocation table.

6. The method of claim 1, further comprising determining the location of the available data locations on the storage device, then upon data transfer, updating the data structure and the peripheral device data structure with the new storage device data locations.

7. A method of transferring data from a peripheral device to a disc drive media, comprising:
    connecting a peripheral device interface to a disc drive interface;
    wherein if two or more peripheral devices are connected to the disc drive interface then aborting the transfer of data;
    wherein if one peripheral device is coupled to the disc drive interface; then
        requesting configuration data from the peripheral device;
        determining the file type and size from the configuration data;
        retrieving a disc drive data structure;
        determining the location on the disc drive media to store the data; and
    transferring the data.

8. The method of claim 7, wherein the disk drive interface comprises a 1394 interface.

9. The method of claim 7, wherein the peripheral device comprises a 1394 interface.

10. The method of claim 7, wherein the peripheral device comprises a camera, video camera, or scanner.

11. The method of claim 7, wherein the disc drive-data structure is a file allocation table.

12. The method of claim 7, wherein determining the location to store the data on the disc drive media comprises comparing a peripheral device data structure to the disc drive media data structure.

13. An electronic data storage system comprising:
    a signal-bearing media means for storing data;
    a code memory means coupled to a read/write controller means for controlling the reading and writing of data to the signal-bearing media,
    means for reading and writing the data to the signal-bearing media;
    means for interfacing with a peripheral device;
    a processor means coupled to the code memory and the read/write controller comprising a program for transferring the data from a peripheral device to the signal-bearing media means, wherein the program when executed by the processor means performs the steps of:
        connecting a peripheral device interface to the interface means;
        wherein if two or more peripheral devices are connected to the interface means then aborting the transfer of data;
        wherein if one peripheral device is connected to the interface means then:
            requesting configuration data from the peripheral device;
            determining the file type and size from the configuration data;
            retrieving a data location structure;
            determining the location on the media to store the data; and
            transferring the data.

14. The system of claim 13, wherein the connection interface means comprises a 1394 interface.

15. The system of claim 13, wherein the peripheral device comprises a 1394 interface.

16. The system of claim 13, wherein the peripheral device comprises a camera, video camera, or scanner.

17. The system of claim 13, wherein the data location structure is a file allocation table.

18. The system of claim 13, wherein determining the location to store the data on the media comprises comparing a peripheral device data structure to the data storage system data structure.

19. A disc drive system comprising:
    a signal-bearing media means for storing data;
    a code memory means coupled to a read/write controller means for controlling the reading and writing of data to the signal-bearing media,
    means for reading and writing the data to the signal-bearing media;
    means for interfacing with a peripheral device;
    a processor means coupled to the code memory and the read/write controller comprising a program for transferring the data from a peripheral device to the signal-bearing media means, wherein the processor means comprises means for determining the location to store the data on the disc drive including means for comparing a peripheral device data structure to the disc drive data structure.

20. The disc drive data structure of claim 19, wherein the disc drive data structure is a file allocation table.

* * * * *